UNITED STATES PATENT OFFICE.

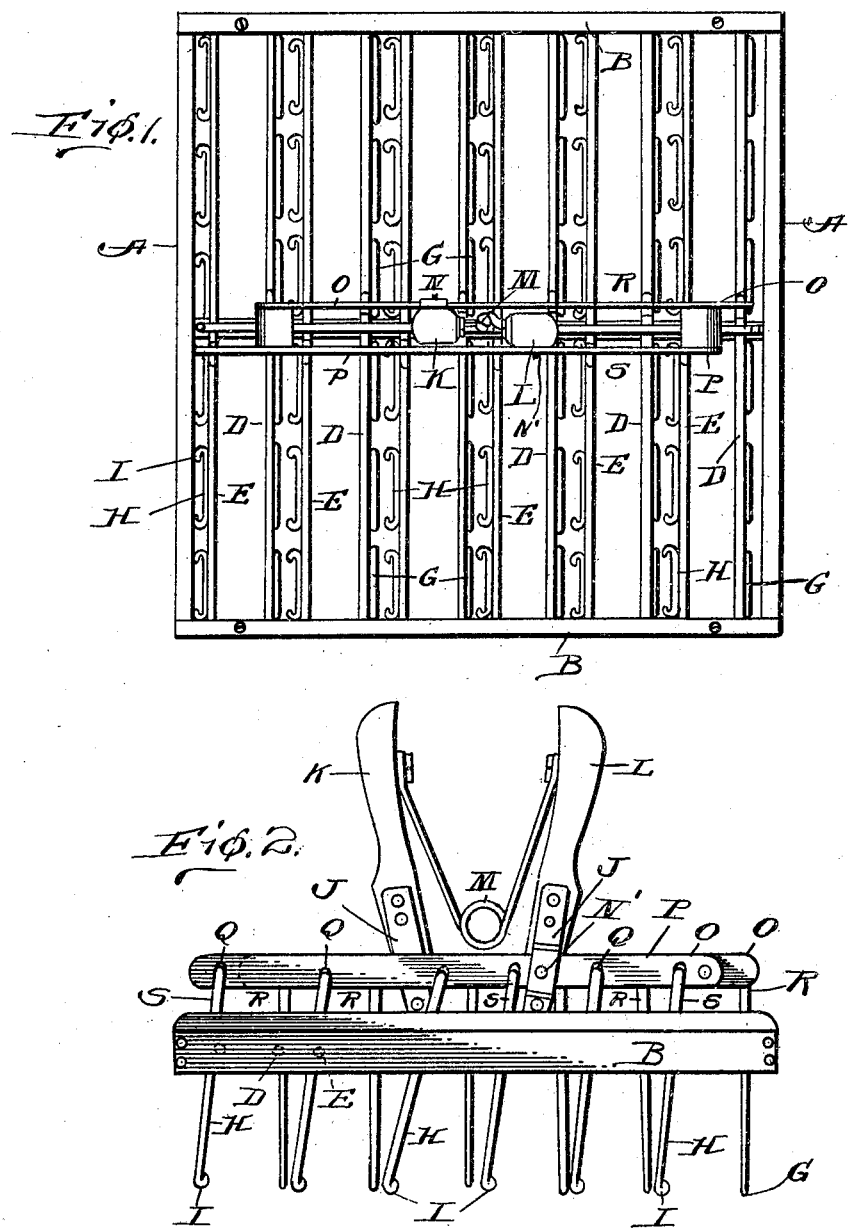

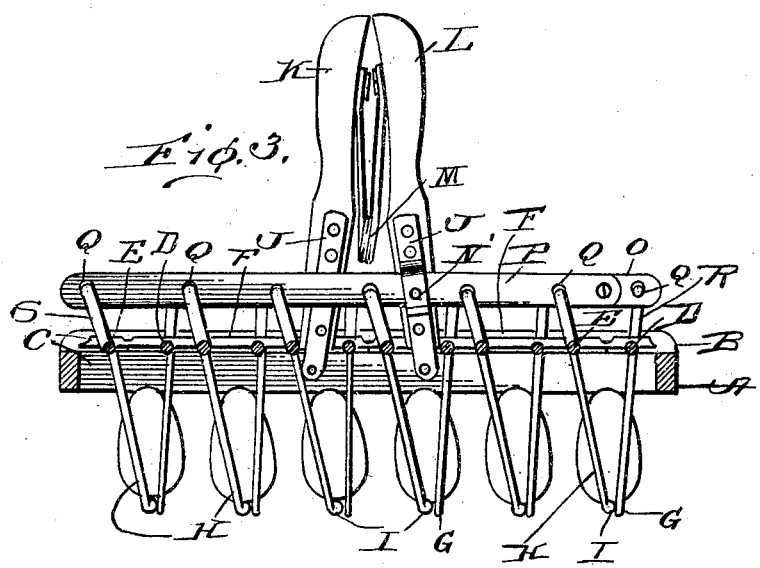
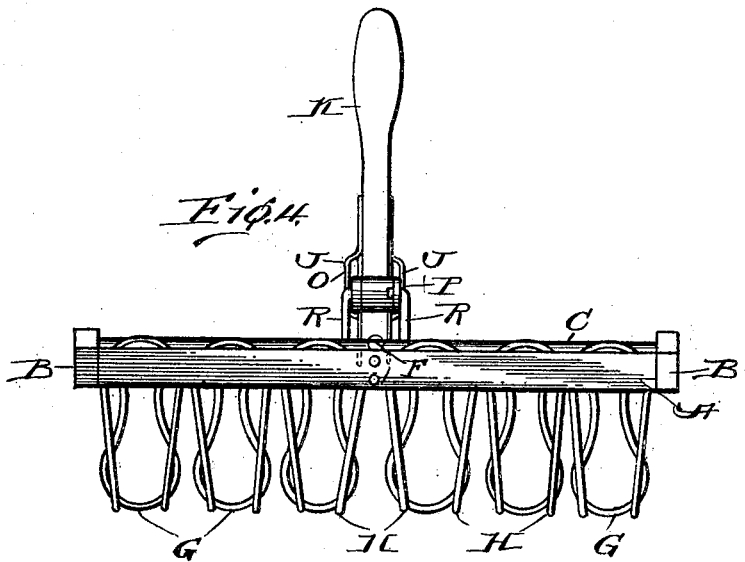

JOSIAH WALLACE LANG, OF FLORIS, IOWA.

EGG-LIFTER.

962,362.　　Specification of Letters Patent.　Patented June 21, 1910.

Application filed August 18, 1909. Serial No. 513,446.

*To all whom it may concern:*

Be it known that I, JOSIAH W. LANG, a citizen of the United States, residing at Floris, in the county of Davis and State of Iowa, have invented certain new and useful Improvements in Egg-Lifters, of which the following is a specification.

My invention relates to improvements in egg lifters, and the leading object of my invention is the provision of a device of this character which will be of strong and durable construction and will efficiently perform the intended functions.

Another object of the invention is the provision of an egg lifter which will be adapted to readily grasp a layer of eggs in a crate to lift the same for examination or to permit of their being transferred from one receptacle to another.

A further object of this invention is the provision of an egg lifter which will securely and firmly grasp the eggs without the slightest danger of breaking the same, and which will be of simple and inexpensive construction.

With these and other hereinafter disclosed objects of a like character in view, my invention consists in an egg lifter embodying certain novel features of construction and combination and arrangement of parts for service substantially as described and as illustrated in the accompanying drawings, in which:

Figure 1, represents a top plan view of the device. Fig. 2, represents a side view thereof, the egg grasping portions being in normal or open position. Fig. 3, represents a longitudinal sectional view of the device in operative position, and, Fig. 4, represents an end view of the egg lifter.

Referring to the drawings, in which similar letters of reference refer to corresponding parts in the various views: the letter A, designates the ends of my device, said sides being held in proper spaced relation by the side strips B interposed therebetween, the whole forming a rectangular frame, while to brace and strengthen the frame I provide the brace bar C, said bar connecting the end strips A at a point intermediate their length and aiding in retaining them in spaced relation, said bar C having a series of semi-circular grooves or recesses formed in its upper face. Resting in said grooves and having their ends pivotally secured in recesses in the inner faces of the strips B are the rods D and E, said rods being alternately disposed and being prevented from becoming disengaged from the grooves in the bar C by means of a longitudinally disposed rod F secured to the top of the bar C and having a series of corresponding grooves in which the rods D and E are engaged and retained.

Suitably secured to and projecting downward from the rods D are a series of loops G, said loops being of such size as to engage the egg and prevent it from slipping downward but being too small to permit the passage of the egg therethrough. Secured to the rods E at points opposite the loops G are the fingers H, said fingers being formed of a piece of wire secured to the rod and having two downwardly extending ends terminating in reversely bent portions as at I, these portions I being filled with solder, or a lump of solder may be placed on the end of each finger without the necessity of bending, the object of forming the enlarged portion I thereon being to provide a larger contacting surface where the finger comes into contact with the egg and thus to obviate the danger of breaking the egg as is liable to be the case when merely a small body comes into contact with the shell thereof.

Pivotally secured to the bar C by means of the plates or brackets J are the handles K and L, a coil spring M being interposed between said handles and having its ends secured thereto to normally force them apart. Pivotally secured to the handle K by means of the pin N having one end engaged in the handle and the other in the extension of the bracket J is the bar O, while similarly secured to the handle L by pin N' is the bar P, said bars O and P having a series of openings Q formed therein. Firmly secured to each rod D and projecting upward therefrom intermediate the length thereof is a crank lever R, the horizontal portion of said crank being engaged in one of the openings in the bar O, while similarly projecting from the rods E are the cranks S, said cranks being engaged in the openings in the bar P, as will be clearly understood by reference to Figs. 2 and 3.

The operation of my device is as follows: The egg lifter in the normal position as shown in Fig. 2 with the grasping portions held open by the action of the spring M in forcing the handles K and L apart is inserted into the crate or other receptacle from which it is desired to remove the eggs. Then, by pressing the handles together, the bars O and P are moved in opposite directions, carrying with them the crank levers R and S, said levers in turn swinging the rods D and E, this motion causing the loops and fingers to engage and hold the eggs as is shown most clearly in Fig. 3.

From the foregoing description taken in connection with the drawings, the construction and operation of my device will be readily understood and its advantages be fully comprehended, and it will be seen that I provide a simple, strong and durable egg lifter and holder.

I claim:

1. In a device of the character described, the combination with a frame, of rock shafts having their ends journaled therein, lugs formed centrally on and projecting from the shafts, fingers carried by the shafts, and means engaging alternate lugs and rocking adjacent shafts in opposite directions to cause the fingers to approach each other to grasp an egg and a spring interposed between the rocking means for returning the parts to normal position.

2. In a device of the character described, the combination with a frame, of rock shafts having their ends journaled therein, loops depending from alternate shafts, fingers of slightly less length than the loops carried by the other shafts, there being a pair of fingers opposite each loop, and means for rocking the shafts to cause the fingers and loop to engage an egg therebetween.

3. In a device of the character described, the combination with a frame, of rock shafts having their ends journaled therein, loops depending from alternate shafts, fingers of slightly less length than the loops carried by the other shafts, there being a pair of fingers opposite each loop, centrally disposed lugs projecting from the shafts, a bar pivotally secured to the upper end of the lug of each loop bearing shaft, a second bar similarly secured to the lugs of the finger bearing shafts, and handles secured to said bars and adapted when pressed together to rock the shafts in opposite directions to cause the loops and fingers to grasp any articles located therebetween.

4. In an egg lifter, the combination with a frame, of rock shafts having their ends journaled therein, loops depending from alternate shafts, fingers carried by the other shafts, there being a pair of fingers opposite each loop, pivotally secured handles carried by the frame, one of said handles having connection with the loop bearing shafts and the other handle with the finger bearing shafts, said handles being adapted to be pressed together to rock the shafts in opposite directions to cause the fingers and loop to engage an egg therebetween.

5. In an egg lifter, the combination with a frame, of rock shafts having their ends journaled therein, loops depending from alternate shafts, fingers carried by the other shafts, there being a pair of fingers opposite each loop, pivotally secured handles carried by the frame, one of said handles having connection with the loop bearing shafts and the other handle with the finger bearing shafts, said handles being adapted to be pressed together to rock the shafts in opposite directions to cause the fingers and loop to engage an egg therebetween, there being a spring interposed between the upper ends of the handles for forcing them apart to return the parts of the lifter to normal position.

In testimony whereof I affix my signature, in presence of two witnesses.

JOSIAH WALLACE LANG.

Witnesses:
T. G. HARPER,
EDNA MILLER.